2 Sheets--Sheet 1.
N. STOW.
Flexible Shafts.
No. 5,939. Reissued June 30, 1874.
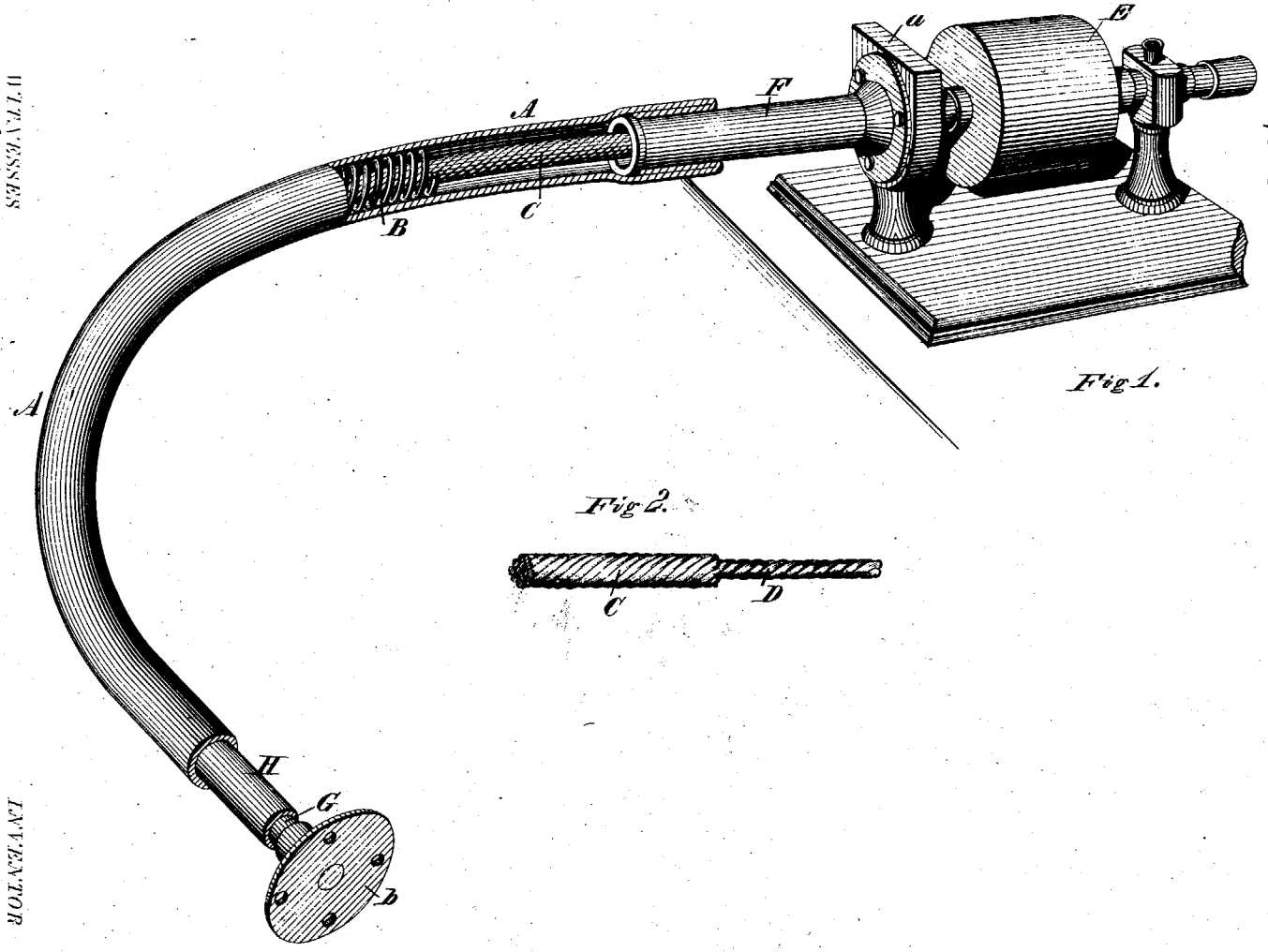
WITNESSES
Harry King
E. L. Davidson,
INVENTOR
Nelson Stow
By
W. G. Baldwin, Jr. Attorney 2 Sheets--Sheet 2.

N. STOW.
Flexible Shafts.

No. 5,939. Reissued June 30, 1874.

WITNESSES

Harry King

E. L. Davidson,

By

Nelson Stow INVENTOR

Wm. D. Baldwin, his Attorney

UNITED STATES PATENT OFFICE.

NELSON STOW, OF BINGHAMTON, NEW YORK, ASSIGNOR TO SAMUEL S. WHITE, OF PHILADELPHIA, PENNSYLVANIA.

IMPROVEMENT IN FLEXIBLE SHAFTS.

Specification forming part of Letters Patent No. 130,253, dated August 6, 1872; reissue No 5,939, dated June 30, 1874; application filed June 2, 1874.

*To all whom it may concern:*

Be it known that I, NELSON STOW, of Binghamton, in the county of Broome and State of New York, have invented certain new and useful Improvements in Flexible Shafts, of which the following is a specification:

My invention relates to that class of flexible shafts constructed of coiled or twisted wire, which are used to communicate power from a driven shaft or pulley to a tool or instrument either fixed or capable of being moved freely in any direction without interfering with the movement of the tool. The first part of my invention relates to a casing or sheath, within which a flexible shaft rotates. Its object is to provide journal-bearings in which the shaft may revolve, a hand-piece or cover by which the shaft may be held and guided, and a casing to envelop the shaft without interfering with its flexibility or free rotation; to which ends my improvement consists, first, in a flexible non-rotating tubular casing or sheath, provided with bearings at its ends, in which casing a flexible wire shaft may rotate; second, in combining a pulley journal-bearing, a non-rotating flexible tubular casing or sheath, secured to said bearings at one end, and free to be placed in any direction relatively to the shaft of the driving-power at the other, and a bearing for a flexible shaft at said free end. My invention further consists; third, in combining a flexible tubular non-rotating casing or sheath with a rotating flexible wire shaft inclosed therein; fourth, in combining a pulley, journal-bearing, a flexible tubular non-rotating casing, secured thereto at one end, and free at the other, a flexible wire shaft revolving in bearings in said casing, and an implement or appliance attached to the wire shaft; fifth, in combining a flexible casing with an inclosed wire shaft, movable endwise therein to compensate the differential flexure of the shaft and casing.

Figure 3:
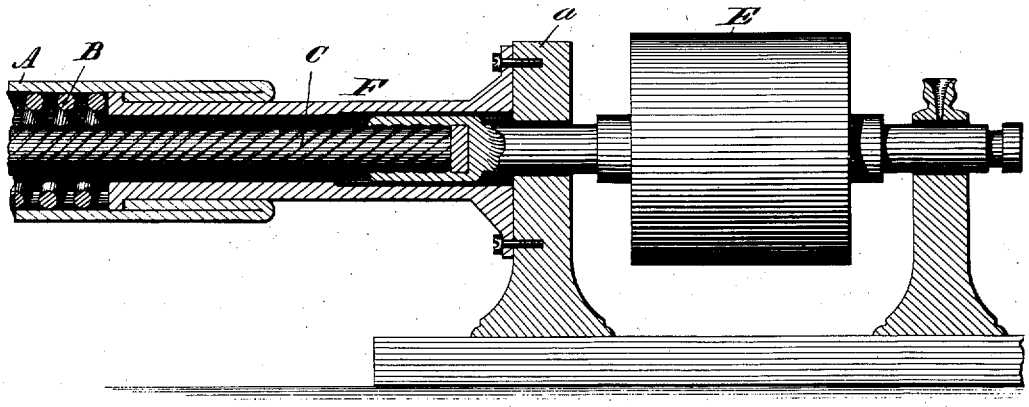
Figure 4:
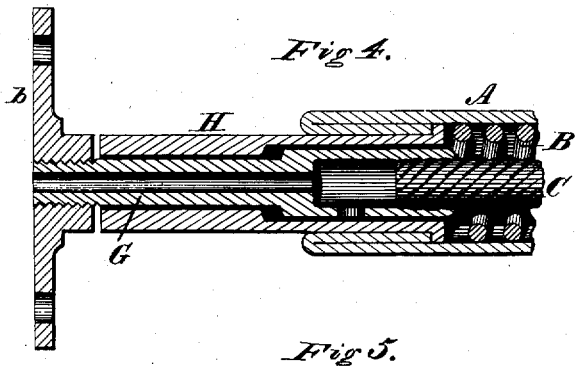
Figure 5:
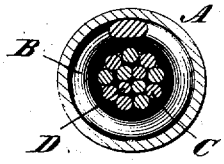

In the accompanying drawings, Figure 1 represents a view, in perspective, of so much of an apparatus in which my improvement is embodied as is necessary to illustrate the invention herein claimed, the free end of the casing and wire shaft being shown as bent at a right angle with the shaft of the driving-pulley, and a portion of the flexible casing removed. Fig. 2 represents a view of a portion of the wire shaft, showing its central cord and spiral envelope. Fig. 3 represents a view, on an enlarged scale, of the pulley-shaft, with a portion of the sheath and flexible shaft in section. Fig. 4 represents the hand-piece. Fig. 5 represents a transverse section through the sheath and shaft.

The casing is composed of an envelope, A, of leather or other flexible material, covering a body, B, made of spirally-coiled wire. The wire shaft is made by twisting together several strands of steel wire, which insures its strength and elasticity, thus forming a central cord, D, which is inclosed in a layer or envelope, C, of wire, wound at the same pitch, and with its spirals running in the same direction as those of the central cord, which gives additional strength to the wire shaft without diminishing its flexibility. This wire shaft is connected with a driving-pulley, E, turning in bearings in a suitable frame. This is capable of moving freely endwise in its bearings, for a purpose hereinafter explained. The wire shaft is secured to the pulley-shaft. A socket, F, attached to the bearing-block *a*, and prolonged in the axial plane of the pulley-shaft, has one end of the flexible casing attached to it, and also forms a case or bearing for the wire shaft. The free end of the sheath or casing A is provided with a socket-bearing, H, in which a journal, G, on the free end of the flexible wire shaft turns. The end of this journal is provided with a collar, *b*, for connections, when the communicated motion is to be continued in one direction. When used for consecutive changes of direction the collar may be dispensed with, and an appliance attached to be guided by hand. The free end of the shaft may then readily be adapted to communicate motion at any point within its reach on the bench of the machine, or for many domestic purposes. The peculiarity of the construction of this shaft will also permit its use for driving heavy machinery.

In bending the shaft, as shown in Fig. 1, for instance, the wire shaft, necessarily, must move endwise in the casing, as the latter bends on a circle of larger radius than the other. The free end of the shaft and casing are connected in such a way as to permit slight end play. (See Fig. 4.) To allow of the end play of the other end of the flexible shaft the shaft of the pulley E is allowed to move endwise in its bearings, as hereinbefore stated. This movement also prevents the springing or trembling of the shaft. The casing not only supports the shaft, while allowing it to be moved freely in all directions, but prevents entanglement with, or the winding of, articles upon the shaft.

I do not claim an articulated rigid shaft, or an articulated rigid casing, as these are old; but What I do claim as of my own invention is—

1. A tubular flexible non-rotating casing or sheath, provided with bearings at each end, adapted for the reception of a flexible wire shaft, as set forth.

2. The combination of a pulley journal-bearing or socket-piece, a tubular flexible non-rotating casing or sheath, secured at one end to said bearing or socket-piece, and free to be placed in any direction relatively to the shaft of the driving-power, and a socket-bearing for a flexible shaft at its free end, substantially as set forth.

3. The flexible tubular non-rotating casing or sheath, combined with a rotating flexible wire shaft, substantially as set forth.

4. The combination of a pulley journal-bearing or socket, a flexible tubular non-rotating casing, secured thereto at one end, and free at the other, a flexible wire shaft revolving in bearings in said casing, and a collar or other instrument attached thereto, substantially as set forth.

5. The combination of a driving-pulley movable endwise in its bearings, a wire shaft passing through said pulley, and a tubular flexible non-rotating casing or sheath, connected at one end with the journal-bearing of the pulley, and provided at the other with a bearing for the wire shaft, these members being constructed to operate in combination, substantially as set forth, whereby the differential flexure of the casing and wire shaft is compensated.

NELSON STOW.

Witnesses:
ROBT. E. PATTISON,
JAMES BATEMAN, Jr.